Aug. 13, 1963

A. L. LEE ETAL 3,100,648

FLUID SEAL

Filed Nov. 17, 1960

INVENTORS
ARTHUR L. LEE
BY ARTHUR B. COVAL

Stanley J. Price

THEIR ATTORNEY

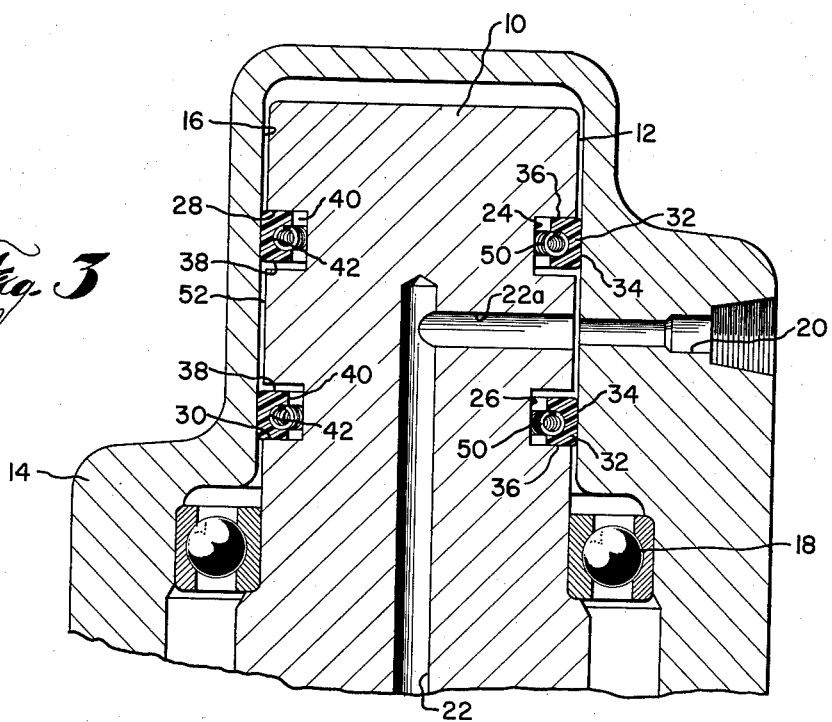
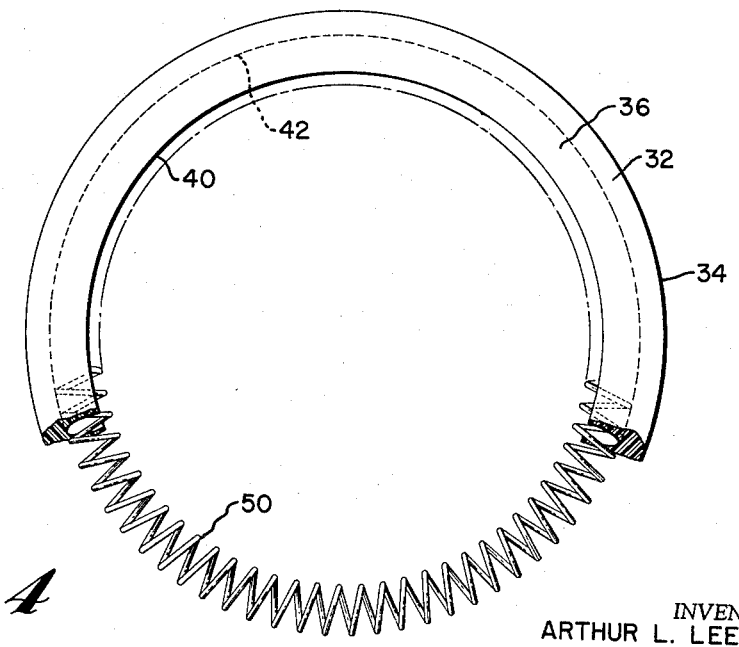

United States Patent Office 3,100,648
Patented Aug. 13, 1963

3,100,648
FLUID SEAL
Arthur L. Lee, and Arthur B. Coval, Columbus, Ohio, assignors to Consolidation Coal Company, Pittsburgh, Pa., a corporation of Pennsylvania
Filed Nov. 17, 1960, Ser. No. 70,022
5 Claims. (Cl. 277—59)

The present invention relates to fluid seals and more particularly to a pressure actuated, self lubricating, running seal to inhibit leakage between two relatively rotatable members.

Running fluid seals present problems of extreme wear and disintegration at high fluid pressures and high rotating speeds. By "running seal" is meant a seal between two relatively rotatable members as opposed to a static seal where the two bodies between which a seal is created have negligible movement relative to each other. It is well recognized in the seal art that static seals do not present the problems of extreme wear under high pressure that are inherent in running seals. Static seals may be utilized at extremely high pressures since the very small magnitude of movement and the low velocity of the relative movement between parts being sealed do not present problems of wear or disintegration to static seals. Running seals, on the other hand, have been hitherto limited to relatively low pressures and operating speeds for prolonged running seal life.

The seals of the present invention may be utilized to seal high pressure fluid and are designed to be utilized at high shaft rotating speeds. The seals of the present invention are both pressure actuated and self lubricating. This invention provides novel self lubricating seals which serve to alleviate the high frictional resistance that has caused failure of earlier high pressure fluid seals.

The present invention may be utilized as a shaft seal to provide a running seal between a rotating shaft and a fixed housing member. A shaft seal should be radially compact, have low friction properties, and, at the same time, be easily assembled and installed on the shaft. The present invention provides shaft seals which require very little effort for installation of the seals.

The fluid seals of the present invention have as their primary elements, a self lubricating deformable plastic seal ring and an expandable back up ring. The deformable ring member has a planar sealing surface which remains in sliding sealing contact with a corresponding planar surface on a rotating shaft. The expandable back up ring of the present invention is positioned within the deformable plastic ring member in a novel manner to urge the deformable ring member radially outwardly into sealing contact with the member to be sealed. The expandable ring also serves to provide rigidity to the deformable piston ring.

By utilizing the combination of a plastic, self lubricating, deformable seal ring with an expandable back up ring, advantageous results are obtained which could not be obtained by the use of one or the other of these elements alone. Several self lubricating plastic materials are available from which seal rings may be formed. One example of this type of plastic is polymerized tetrafluoro ethylene, sold commercially under the trademark "Teflon." While these plastic materials have excellent self lubricating, wear resistant and chemical resistant properties, they are, of themselves, not sufficiently resilient to produce good sealing elements. In the present invention, sealing elements are formed from self lubricating plastic such as "Teflon" and the necessary resilience for the sealing element is supplied by a novel expandable back up ring usually formed of spring steel or the like. A combination of the deformable plastic seal ring with the expandable back up ring may be utilized to effectively seal high pressure fluid at extremely high rotating speeds.

In the following detailed description, the seals of the present invention will be described as shaft seals adapted to permit fluid communication between a fluid passage within a fixed housing member and a fluid passage within a rotating shaft member so that fluid under pressure may continually pass from one passage to the other without substantial leakage around the outer portion of the shaft. While the housing will be referred to as a fixed housing and the shaft will be referred to as a rotating shaft throughout this specification, it is within the scope of the present invention to have a rotatable outer housing and a fixed shaft member.

With the foregoing considerations in mind, it is a primary object of the present invention to provide an improved running fluid seal.

Another object of this invention is to provide a running seal which has long life under high pressure and high speed conditions.

Another object of this invention is to provide a seal incorporating a deformable seal ring member formed of self lubricating material.

Another object of this invention is to provide a seal incorporating a deformable seal ring member which overlays an expandable ring to provide resilience to the deformable ring member.

Another object of this invention is to provide a running seal that is radially compact and easily assembled and installed on a shaft.

These and other objects achieved by this invention will become apparent as this description proceeds in conjunction with the accompanying drawings.

In the drawings:

FIGURE 3 is a sectional view of a second embodiment of a high pressure running seal built in accordance with the principles of the present invention.

FIGURE 4 is a plan view, similar to FIGURE 2, of the novel deformable ring member and expandable ring of the embodiment of FIGURE 3.

Figure 1:
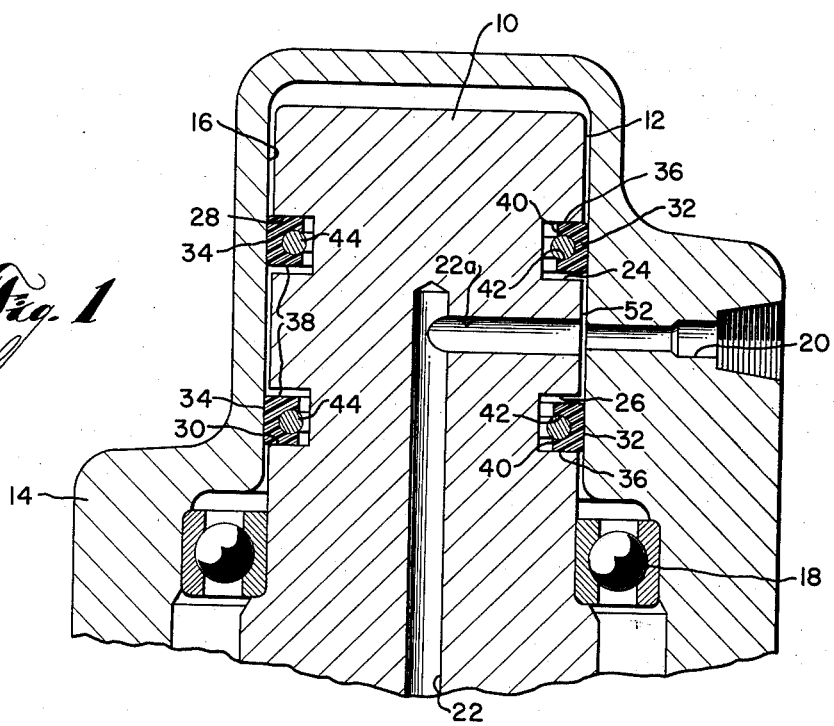
FIGURE 1 is a sectional view of a high pressure running seal built in accordance with the principles of the present invention.
Figure 2:
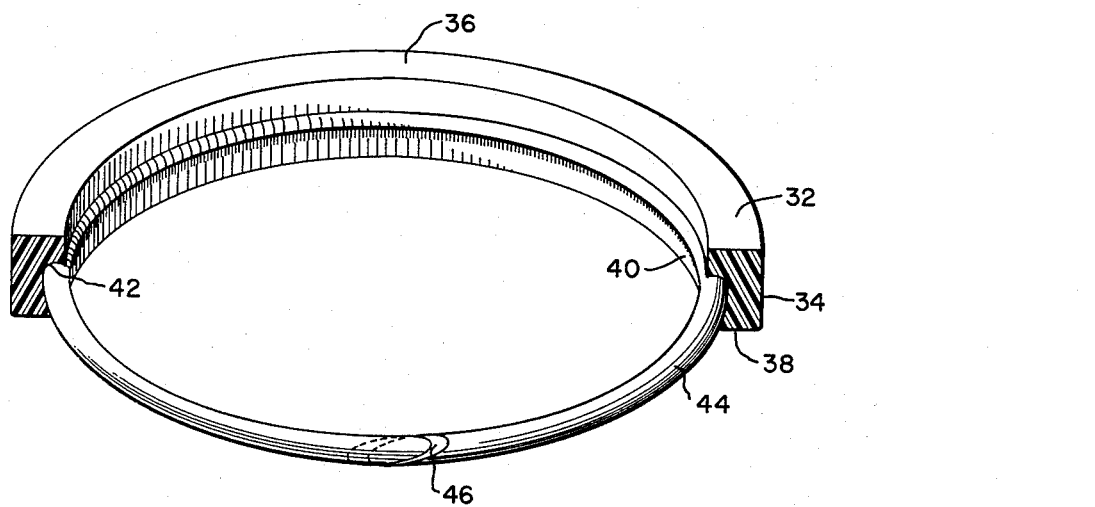
FIGURE 2 is a perspective view of the novel deformable ring member and expandable ring of the seal of FIGURE 1 with the deformable ring broken away to illustrate the manner in which the expandable ring is positioned therein.

Referring to the drawings, and particularly to FIGURES 1 and 2, there is shown a shaft 10 having a cylindrical external surface 12. Surrounding the shaft 10 is a housing member 14 having a cylindrical internal surface 16. The cylindrical external surface 12 of shaft 10 is maintained in coaxial relation to the internal cylindrical surface 16 of housing 14 by the bearing 18. Bearing 18 permits the shaft 10 to freely rotate relative to housing 14.

The housing 14 has a fluid passage 20 which communicates with the cylindrical internal surface 16 of the housing. A fluid passage 22 is formed within the shaft 10. Passage 22 has a radially extending portion 22a which communicates with the cylindrical external surface 12 of the shaft 10. When the shaft 10 is in position within the housing 14, the passage 20 of housing 14 and the radially extending portion 22a of passage 22 within shaft 10 are axially aligned with each other.

Formed within the cylindrical external surface 12 of shaft 10, one on either side of the radially extending portion 22a of passage 22, are annular recesses 24 and 26. The annular recess 24 has a smooth, planar sealing surface 28 formed on the wall furthermost from the passage 22a. Likewise, the annular recess 26 has a smooth, planar sealing surface 30 formed on the furthermost end wall from passage 22a. Both planar sealing surfaces 28 and 30 extend radially in planes which are normal to the axis of the cylindrical surface 12 of shaft 10.

Freely received within the shaft annular recesses 24 and 26 are deformable ring members 32. The deformable ring members 32 are identical to each other and their construction may best be seen in FIGURE 2. As seen in FIGURE 2, each deformable ring member 32 has a cylindrical external surface 34, a planar sealing surface 36 extending in a plane perpendicular to the cylindrical external surface 34 and a planar fluid contacting surface 38 extending in parallel spaced relation to the planar sealing surface 36. Each of the deformable ring members 32 has an internal surface 40 in which is formed an annular recess 42. With the annular recess 42 formed in surface 40, each of the deformable ring members 32 has a generally U-shaped radial cross section as best seen in FIGURE 2.

The deformable ring member 32 is preferably formed of a self lubricating, deformable, chemical resistant, plastic material. Plastics sold commercially under the trademark "Teflon" can be utilized to form rings 32.

An expandable ring 44 which is split at 46 to permit circumferential expansion and contraction of the ring fits snugly within recess 42 in deformable ring member 32. The expandable ring in its relaxed condition has a circumference greater than the maximum circumference of recess 42 so that when the ring is placed within recess 42, ring 44 tends to expand the deformable ring member 32 radially outwardly. The expandable ring 44 is preferably formed of spring steel to give it inherent resilience and expansion properties.

Referring to FIGURES 3 and 4, a second embodiment of the seal of the present invention is shown in detail. The embodiment of FIGURES 3 and 4 is identical in all respects to that of FIGURES 1 and 2 except that the expandable ring 50 of FIGURES 3 and 4 is formed from a helical spring whereas the expandable ring 44 of FIGURES 1 and 2 is formed of a solid piece of spring steel.

Identical reference numerals have been affixed to the elements of FIGURES 3 and 4 which are identical to those of FIGURES 1 and 2. The foregoing description of the components of FIGURES 1 and 2 applies equally well to the elements of FIGURES 3 and 4 and will not be repeated. In the embodiment of FIGURES 3 and 4, the expandable ring 50 is formed by closing a length of helical spring on itself. The helical spring from which ring 50 is formed is greater in length than in the circumference of the recess 42 formed within the deformable ring member 32. Accordingly, when the expandable ring 50 is placed within the recess 42 of deformable member 32, the helical spring of the expandable ring 50 is in compression and tends to expand the deformable ring 32 radially outwardly.

In assembly of the seals of FIGURES 1, 2, 3 and 4, the expandable rings 44 or 50 are positioned within their respective deformable ring members 32. The assembly of the ring member 32 and the expandable ring 44 or 50 is then positioned within the respective annular recesses 24 and 26. Each deformable ring member 32 is placed with the planar sealing surface 38 of the ring member facing toward the planar sealing surface 28 of recess 24 or toward the planar sealing surface 30 of recess 26. The recesses 24 and 26 and the ring members 32 are of such size that the ring may move axially within its respective recess. The ring members 32 and the expandable rings 44 or 50 are positioned within their respective recesses 24 and 26 prior to the placing of the shaft 10 in position within the housing 14.

Once the rings are in position on the shaft 10, the shaft 10 and the ring members 32 are placed within the cylindrical internal surface 16 of housing 14. The cylindrical internal surface 16 of housing 14 has a circumference less than the maximum expanded circumference of the deformable ring member 32 but greater than the minimum circumference of the ring member 32. Accordingly, when the ring members 32 and the expandable rings 44 or 50 are inserted within the cylindrical internal surface 16, the ring members 32 expand outwardly under the urging of the expandable rings 44 or 50 against the cylindrical surface 16 of housing 14 so that there is a tight, frictional, nonrotating and sealing relation between the external cylindrical surface 38 of each deformable ring member 32 and the cylindrical internal surface 16 of the housing 14.

As shown in FIGURES 1 and 3, there is an exaggerated clearance between the external cylindrical surface 12 of shaft 10 and the internal cylindrical surface 16 of housing 14. In actual practice there is but a slight clearance between the surface 12 and the surface 16 so that the shaft 10 may rotate freely within the housing 14.

Once in position within the housing 14, the shaft 10 has its radially extending passage 22a in axial alignment with the passage of housing 14. The seal rings 32 define the axial limits of an annular chamber 52 between housing 14 and shaft 10 into which high pressure fluid may be conducted so that it may pass between passage 20 and passage 22a. If, for example, high pressure fluid is conducted into passage 20 for ultimate flow through passage 22, high pressure fluid fills the annular chamber between the seal rings 32. This high pressure fluid forces the deformable ring members 32 into sliding sealing relation with the planar sealing surfaces 28 and 30 formed within the annular recesses 24 and 26 respectively. Thus as the shaft 10 rotates, the housing 14 and the deformable ring members 32 remain fixed while the shaft 10 rotates. Accordingly, the fluid seal is between the ring planar sealing surface 38 and the shaft planar sealing surface 28 at recess 24 and between the ring members sealing surface 38 and the shaft planar sealing surface 30 at recess 26.

In the seals of the present invention, the deformable ring members 32 are formed from self lubricating plastic material which is deformable. This self lubricating plastic material lacks the natural resiliency to produce a good seal element. This lack of resiliency is overcome by supplying expandable rings 44 or 50 which urge the deformable ring members 32 radially outwardly into contact with the cylindrical internal surface of the housing member.

Since the deformable ring members 32 are formed from self lubricating plastic material, little or no wear occurs between the planar sealing surface of the metal shaft member 10 and the planar sealing surface of the plastic deformable ring members 32. Accordingly, the seals of the present invention have prolonged life and are effective to seal high pressure fluid. When high pressure fluid is being sealed, the fluid pressure serves to more forcefully engage the planar sealing surfaces of the ring members 32 with the planar sealing surfaces of the shaft 10 so that the self actuated pressure increases its sealing force for an increase of pressure being sealed.

According to the provisions of the patent statutes, we have explained the principle, preferred construction and mode of operation of our invention and have illustrated and described what we now consider to represent its best embodiments. However, we desire to have it understood that, within the scope of the appended claims, the invention may be practiced otherwise than as specifically illustrated and described.

We claim:

1. A rotary fluid seal for preventing the passage of fluid between first and second relatively rotatable members and to conduct fluid under pressure from a passage formed in said first member to a passage formed in said second member without substantial loss of fluid pressure therebetween, said first member having an external surface with said first member passage communicating therewith, said first member being positioned coaxially within a cylindrical internal surface formed in said second member, said second member passage communicating with said second member cylindrical surface and said first member passage, said seal comprising a pair of annular radially extending planar sealing surfaces on said first member, said planar sealing surfaces each positioned axially outwardly from said first member passage, first and second deformable ring members each having a cylindrical external surface, a radially extending planar sealing surface, a radially extending planar fluid engaging surface disposed in parallel spaced relation to said sealing surface, and an internal surface formed with an annular recess therein so that said ring member has a substantially U shaped radial cross section, first and second radially expandable rings positioned respectively within said first and second deformable ring member annular recess, said first and second deformable ring members and said first and second radially expandable rings being positioned within said first member first and second annular recesses respectively with said deformable ring member cylindrical external surfaces in frictional, nonrotating and sealing engagement with said second member cylindrical internal surface, said first and second radially expandable rings tending to expand radially outwardly to maintain said respective first and second deformable ring members in engagement with said second member cylindrical internal surface, said first and second deformable ring members being urged axially away from each other by fluid pressure between said first and second members so that said first and second deformable ring member planar sealing surfaces are in sliding sealing relation with said first member first and second recess sealing surfaces respectively.

2. A rotary fluid seal for preventing the passage of fluid between first and second relatively rotatable members and to conduct fluid under pressure from a passage formed in said first member to a passage formed in said second member without substantial loss of fluid pressure therebetween, said first member having a cylindrical external surface with said first member passage communicating therewith, said first member being positioned coaxially within a cylindrical internal surface formed in said second member, said second member passage communicating with said second member cylindrical surface and positioned in axial alignment with said first member passage when said first member is in place within said second member, said seal comprising first and second annular recesses formed in said first member cylindrical external surface in axially spaced relation on each side of said first member passage, said first and second annular recesses each having a planar sealing surface extending radially inwardly from said first member cylindrical external surface, said planar sealing surfaces each being positioned axially outwardly from said first member passage, first and second deformable ring members each having a cylindrical external surface, a radially extending planar sealing surface, a radially extending planar fluid engaging surface disposed in parallel spaced relation to said sealing surface, and an internal surface formed with an annular recess therein so that said ring member has a substantially U shaped radial cross section, first and second radially expandable rings positioned respectively within said first and second deformable ring member annular recess, said first and second deformable ring members and said first and second radially expandable rings being positioned within said first member first and second annular recesses respectively with said deformable ring member cylindrical external surfaces in frictional, nonrotating and sealing engagement with said second member cylindrical internal surface, said first and second radially expandable rings tending to expand radially outwardly to maintain said respective first and second deformable ring members in engagement with said second member cylindrical internal surface, said first and second deformable ring members being urged axially away from each other by fluid pressure between said first and second members so that said first and second deformable ring member planar sealing surfaces are in sliding sealing relation with said first member first and second recess sealing surfaces respectively.

3. The rotary fluid seal of claim 2 wherein said expandable rings are formed from spring steel.

4. The rotary fluid seal of claim 2 wherein each of said expandable rings is formed from a length of helical spring.

5. The rotary fluid seal of claim 2 wherein said deformable ring members are formed from a self-lubricating plastic material.

References Cited in the file of this patent
UNITED STATES PATENTS

| | | |
|---|---|---|
| 2,162,218 | Hill | June 13, 1939 |
| 2,512,883 | Warren | June 27, 1950 |